United States Patent
Hamada

(10) Patent No.: US 10,481,254 B2
(45) Date of Patent: Nov. 19, 2019

(54) RADAR DEVICE AND METHOD FOR DETERMINING TARGETS TO BE FOLLOWED

(71) Applicant: Panasonic Intellectual Property Management Co., Ltd., Osaka (JP)

(72) Inventor: Asako Hamada, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 224 days.

(21) Appl. No.: 15/617,367

(22) Filed: Jun. 8, 2017

(65) Prior Publication Data
US 2017/0371033 A1    Dec. 28, 2017

(30) Foreign Application Priority Data
Jun. 22, 2016    (JP) ................. 2016-123566

(51) Int. Cl.
| | |
|---|---|
| G01S 13/72 | (2006.01) |
| G01S 13/42 | (2006.01) |
| G01S 13/58 | (2006.01) |
| G01S 13/93 | (2006.01) |
| G01S 7/41 | (2006.01) |
| G01S 13/52 | (2006.01) |

(52) U.S. Cl.
CPC ............ G01S 13/726 (2013.01); G01S 7/414 (2013.01); G01S 7/415 (2013.01); G01S 13/42 (2013.01); G01S 13/52 (2013.01); G01S 13/58 (2013.01); G01S 13/589 (2013.01); G01S 13/931 (2013.01); *G01S 2013/9375* (2013.01)

(58) Field of Classification Search
None
See application file for complete search history.

(56) References Cited

U.S. PATENT DOCUMENTS

| | | | |
|---|---|---|---|
| 5,929,803 A | 7/1999 | Uehara et al. | |
| 2008/0012752 A1 | 1/2008 | Okamura et al. | |
| 2014/0085127 A1* | 3/2014 | Kishigami | G01S 13/91 342/108 |
| 2016/0152235 A1* | 6/2016 | Nishimura | G01S 7/411 701/36 |

FOREIGN PATENT DOCUMENTS

JP    2010-266225 A    11/2010

OTHER PUBLICATIONS

Extended European Search Report, dated Dec. 12, 2017, for the related European Patent Application No. 17176524.1-1812, 8 pages.

* cited by examiner

*Primary Examiner* — Whitney Moore
(74) *Attorney, Agent, or Firm* — Seed IP Law Group LLP

(57) ABSTRACT

A radar device that detects one or more information elements, groups the one or more information elements into one or more first groups in each frame, the one or more first groups including information on one or more first objects of which Doppler speeds fall within a determined range, groups the one or more information elements into one or more second groups in each frame, the one or more second groups including information on one or more second objects of which Doppler speeds fall outside the determined range calculates first positions in m-th frame, of positions of groups to be followed of the first groups and the second groups in n-th frame and extracts the groups to be followed in the m-th frame from the first groups and the second groups in the m-th frame using the first positions.

5 Claims, 6 Drawing Sheets

RADAR DEVICE AND METHOD FOR DETERMINING TARGETS TO BE FOLLOWED

BACKGROUND

1. Technical Field

The present disclosure relates to a radar device that detects and follows a moving object, and a method for determining targets to be followed.

2. Description of the Related Art

Technologies that use a radar device mounted on a vehicle or the like to detect objects such as a preceding vehicle, a stopping vehicle, or a pedestrian have been widely used in recent years. For example, Japanese Patent No. 5206579 discloses a method including first removing stationary objects such as a street tree or crash barrier from detected objects and determining that the remaining objects are moving objects.

SUMMARY

One non-limiting and exemplary embodiment facilitates providing a radar device that is able to follow a moving object, and a method for determining target groups.

In one general aspect, the techniques disclosed here feature radar circuitry which, in operation, transmits a plurality of radar signals, receives the plurality of radar signals, each of the plurality of received radar signals being reflected from a reflection point of a plurality of reflection points on an object of a plurality of objects, and detects, based on the plurality of received radar signals, one or more information elements, a first group detector which, in operation, groups the one or more information elements into one or more first groups in each frame, the one or more first groups including information on one or more first objects of which Doppler speeds fall within a determined range, the one or more first objects being included in the plurality of objects, a second group detector which, in operation, groups the one or more information elements into one or more second groups in each frame, the one or more second groups including information on one or more second objects of which Doppler speeds fall outside the determined range, the one or more second objects being included in the plurality of objects, a position calculator which, in operation, calculates first positions in m-th frame, of positions of groups to be followed of the first groups and the second groups in n-th frame, n being an integer of 1 or more, m being an integer satisfying m>n, and a processor which, in operation, extracts the groups to be followed in the m-th frame from the first groups and the second groups in the m-th frame using the first positions.

It should be noted that general or specific embodiments may be implemented as a system, a method, an integrated circuit, a computer program, a storage medium, or any selective combination thereof.

According to the one embodiment of the present disclosure, a moving object can be followed.

Additional benefits and advantages of the disclosed embodiments will become apparent from the specification and drawings. The benefits or advantages may be individually obtained by the various embodiments and features of the specification and drawings, which need not all be provided in order to obtain one or more of such benefits or advantages.

DETAILED DESCRIPTION

Figure 1:
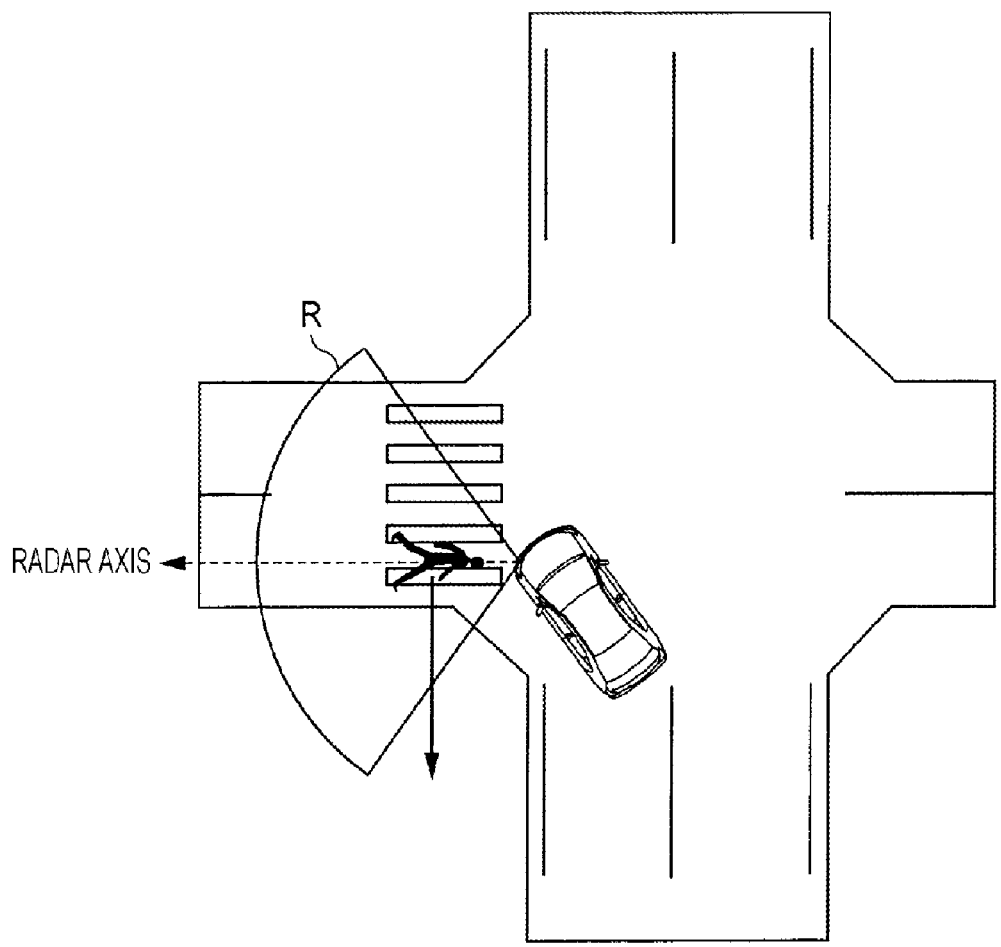
FIG. 1 shows an example of the radar transmission wave application direction of a radar device mounted on a vehicle.

There have been widely used technologies that prevent collision by using a radar device mounted on a front-side portion of a vehicle or the like to detect objects in front of and on the sides of the vehicle or the like. FIG. 1 is a drawing showing an example of the object detection range of a radar device mounted on a vehicle. In FIG. 1, the vehicle is stopping while waiting for turning left, whereas a pedestrian is crossing a road through a crosswalk. A dotted arrow shown in FIG. 1 shows the direction of one beam transmitted from the front of the radar device mounted on the vehicle (hereafter referred to as the radar transmission wave radiation direction or radar axis), and a fan-shaped range around this direction is the object detection range R of the radar device. FIG. 1 illustrates a case where the radar transmission wave radiation direction is the front-left direction of the vehicle.

The radar device detects the moving components of the detected object with respect to the radar axis by calculating the Doppler speed of the object. However, if the object is moving in a direction perpendicular to a straight line connecting the object and radar device (the cross-range direction), the Doppler speed of the object with respect to the radar device becomes 0, making it difficult for the radar device to detect whether the object is moving.

Figure 2:
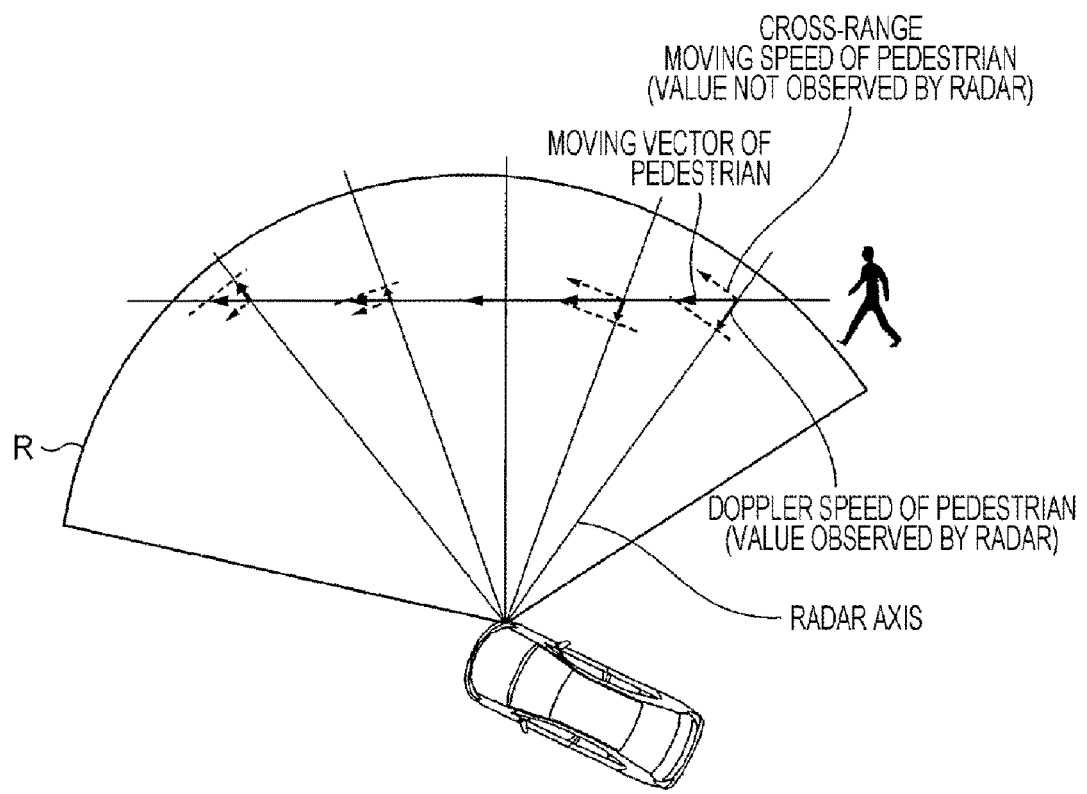
FIG. 2 shows the relationship between the moving direction of a moving object seen from a radar device and the Doppler speed.

FIG. 2 is a drawing showing the relationship between the moving direction of an object with respect to a radar device and the Doppler speed. The object detection range R shown in FIG. 2 illustrates the object detection range of a radar device mounted on a stopping vehicle. Arrows (solid lines) indicating Doppler speeds corresponding to directions of the object (pedestrian) with respect to the radar device, arrows indicating the moving vector of the pedestrian (a solid line), and arrows indicating the moving speeds (dotted lines) of the pedestrian in the cross-range directions of the directions of the object are shown in the object detection range R.

The Doppler speed becomes a positive value when the object approaches the radar device; it becomes a negative value when the object leaves the radar device. As shown in FIG. 2, when the object crosses the object detection range R on the front-right side of the vehicle, the Doppler speed of the object with respect to the radar device gradually changes from a positive value to negative value as the object-radar device positional relationship changes. When the moving direction of the object becomes perpendicular to the radar axis, that is, when the moving direction of the object matches the cross-range direction, the speed components of the object in the radar-axis direction with respect to the radar device become 0. Thus, the Doppler speed with respect to the radar device becomes 0.

In the case of a conventional radar device, when the Doppler speed of a moving object with respect to the radar device is close to 0, the radar device may erroneously recognize the moving object as a stationary object, depending on the combination of the moving direction and position of the moving object.

The above object detector disclosed in Japanese Patent No. 5206579 groups reflection points (detection points on an object detected using radar reflection waves) detected using speed information and provides the resulting group with an attribute indicating that the object is a moving object or stationary object. The object detector then determines whether groups detected in each cycle time of the radar device are the same group, on the basis of speed information or attributes in a time series manner. The object detection device then continues detecting the position or speed of the moving object determined to be the same object, in a time series manner.

When a moving object has a particular moving direction and position as illustrated in FIG. 2, the object detection device disclosed in Japanese Patent No. 5206579 would erroneously recognize the moving object as a stationary object and provide the moving object with an attribute "stationary object." That is, the object detector of Japanese Patent No. 5206579 would change the attribute of the object from "moving object" to "stationary object" with a lapse of time. As a result, the object detector of Japanese Patent No. 5206579 would have difficulty in determining whether the object is the same, on the basis of the attributes before and after the lapse of time and therefore following the object (following the position or speed of the object in a time series manner).

Figure 3A:
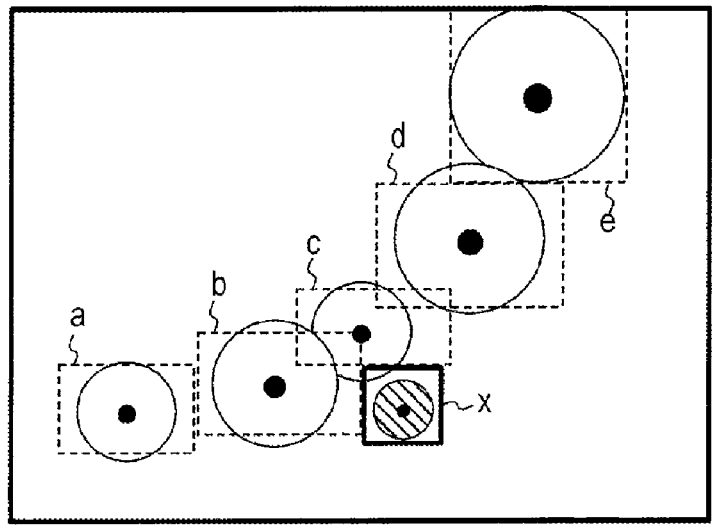
FIG. 3A shows association between frames in a following process.
Figure 3B:
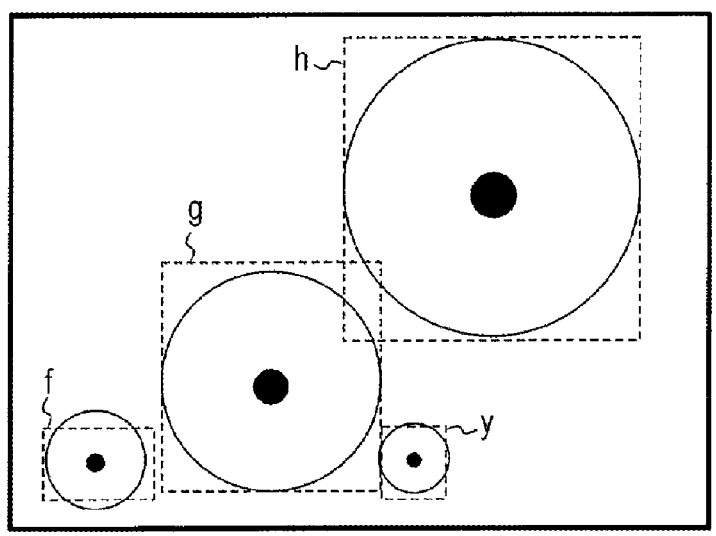
FIG. 3B shows association between frames in a following process.

FIGS. 3A and 3B are drawings showing a following process. In the following process, for example, reflection points are grouped into groups (grouping) in each frame, and each group is provided with an attribute "moving object" or an attribute "stationary object." For example, reflection points are grouped on the basis of information about the speeds or the like of the reflection points. As used herein, the term "frame" refers to a time period required to detect reflection points once.

FIG. 3A shows the result of grouping in frame n (FrameNo=n), and FIG. 3B shows the result of grouping in frame n+1 (FrameNo=n+1). FIGS. 3A and 3B each show a reflection point map obtained by capturing a pedestrian near roadside objects and a result obtained by grouping multiple reflection points. FIG. 3A illustrates a case where groups a to e and a group x are formed, and FIG. 3B illustrates a case where groups f to h and a group y are formed.

Oblique lines drawn in the group x in FIG. 3A mean that the Doppler speed of the group x has a value (is not zero). In FIG. 3B, oblique lines are not drawn in the group y, meaning that the Doppler speed is 0. The group x in FIG. 3A and the group y in FIG. 3B actually correspond to a pedestrian (moving object) as illustrated in FIGS. 1 and 2 and are moving within the detection range (the object detection range R) of the radar device.

When the moving direction of the pedestrian becomes perpendicular to the radar axis (that is, becomes the cross-range direction) in frame n+1, the Doppler speed of the group y, which corresponds to the pedestrian, becomes 0. On the other hand, the moving direction of the pedestrian is not perpendicular to the radar axis (that is, does not match the cross-range direction) in frame n and therefore the Doppler speed of the group x is not 0, as shown in FIG. 3A. Consequently, the object detector erroneously recognizes the pedestrian (moving object) as a stationary object, as described with reference to FIG. 2.

In other words, if grouping is performed as illustrated in FIGS. 3A and 3B, the group x corresponding to the pedestrian in the n-th frame (FIG. 3A) and the group y corresponding to the pedestrian in the (n+1)th frame (FIG. 3B) are provided with different attributes. This makes it difficult for the object detector to follow the pedestrian, resulting in an interruption of the following. Consequently, even if the object detector successfully captures a group corresponding to a moving pedestrian in a subsequent frame, it would have difficulty in recognizing that the captured group is an object corresponding to the same object as the group x and group y, resulting in an interruption of the following.

In view of the foregoing, a non-limiting embodiment of the present disclosure provides a radar device that is able to follow a moving object, regardless of the moving direction or position of the moving object.

Embodiment

Figure 4:
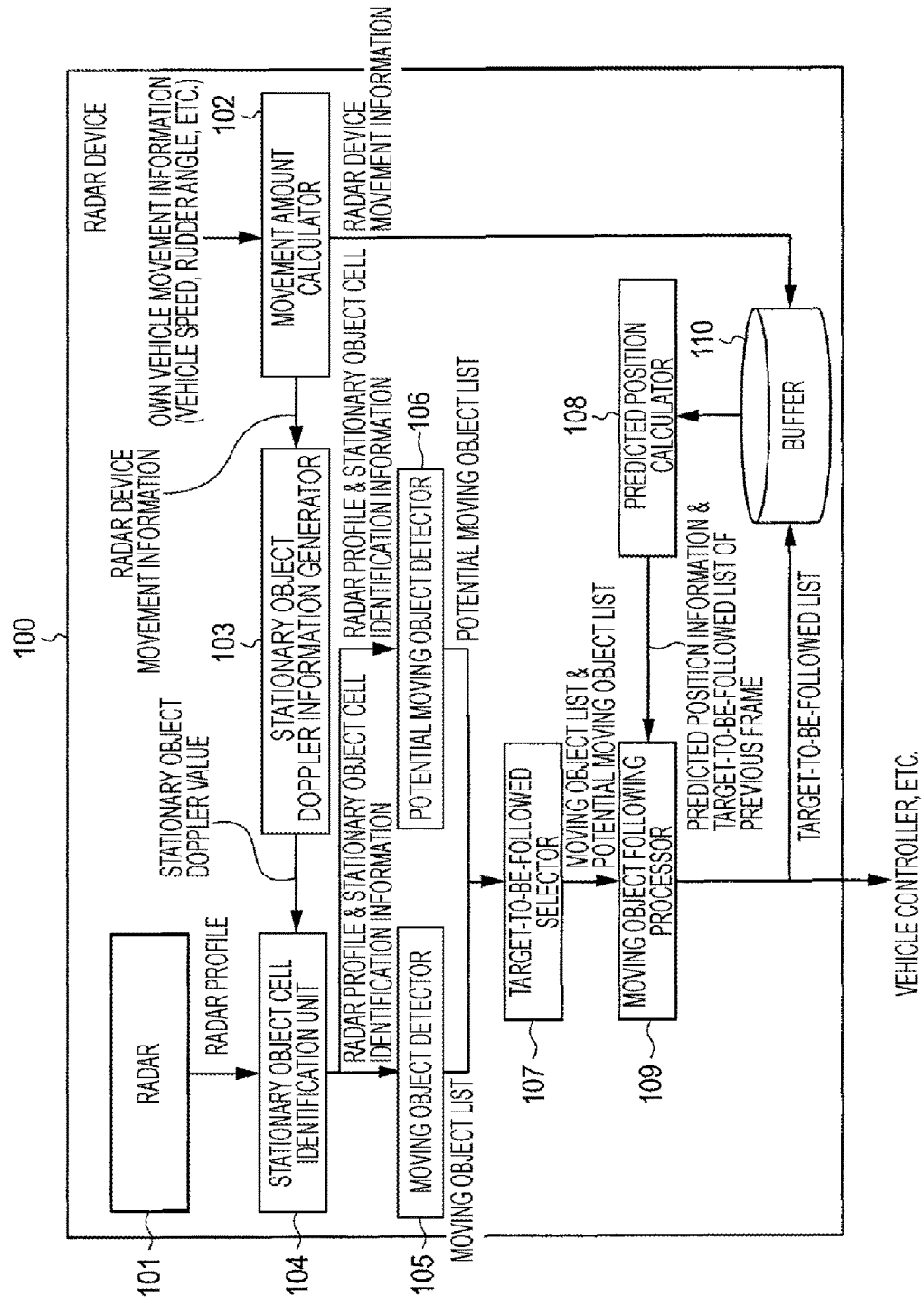
FIG. 4 shows an example configuration of a radar device according to the present embodiment.

The embodiment of the present disclosure will be described below. FIG. 4 is a drawing showing an example configuration of a radar device 100 according to the present embodiment. The radar device 100 of the present embodiment shown in FIG. 4 includes a radar 101, a movement amount calculator 102, a stationary object Doppler information generator 103, a stationary object cell identification unit 104, a moving object detector 105, a potential moving object detector 106, a target-to-be-followed selector 107, a predicted position calculator 108 (a position calculator), a moving object following processor 109 (a processor), and a buffer 110. A radar of the present disclosure corresponds to the radar 101; a first group detector thereof to the potential moving object detector 106; a second group detector thereof to the moving object detector 105; a position calculator thereof to the position calculator 108; a processor thereof to the moving object following processor 109; and an update unit thereof to the target-to-be-followed selector 107.

The radar device 100 is mounted on, for example, a movable vehicle. The radar device 100 detects an object (e.g., a roadside object, pedestrian, another vehicle) near the vehicle and then outputs information about the detected object to a vehicle controller or the like mounted on the vehicle. Thus, if an object is present in the traveling direction of the vehicle, the vehicle controller is able to prevent the vehicle from colliding with the object by performing vehicle control such as deceleration. Examples of the information about the detected object include a target-to-be-followed list including objects to be followed.

Configuration

The radar 101 generates a radar transmission wave, for example, in a millimeter-wave band and transmits it from a transmission antenna. The radar 101 transmits a radar transmission wave at a predetermined azimuth (a radar azimuth) in each frame and receives the radar transmission wave reflected from an object and serving as a reflected-wave signal using a receiving antenna. The transmission antenna or receiving antenna is not shown.

Also, in each frame, the radar 101 detects reflection points on the basis of reflected-wave signals, generates reflection point information including the distances to the reflection points, the azimuths, the relative speeds, the reflected-wave strengths, and the like, and outputs the generated reflection point information (hereafter referred to as a radar profile) to the stationary object cell identification unit 104.

The movement amount calculator 102 calculates radar device movement information about the amount of movement of the radar device 100 (e.g., the moving speed and moving direction of the radar device 100) using vehicle movement information such as the speed or rudder angle of the vehicle, which is information about the amount of movement of the vehicle, and information about the mounting position of the radar device 100 mounted on the vehicle. The vehicle movement information may be detected by, for example, a sensor (not shown) mounted on the vehicle. Note that the movement amount calculator 102 need not necessarily calculate radar device movement information using vehicle movement information. For example, the movement amount calculator 102 may calculate radar device movement information by statistically processing reflection point information outputted by the radar 101.

The movement amount calculator 102 calculates radar device movement information, for example, on a frame basis. The movement amount calculator 102 outputs the calculated radar device movement information to the stationary object Doppler information generator 103 and buffer 110. The movement amount calculator 102 may also output the vehicle movement information to the stationary object Doppler information generator 103.

The stationary object Doppler information generator 103 calculates stationary object Doppler values corresponding to radar azimuths on the basis of the radar device movement information received from the movement amount calculator 102 in each frame. As used herein, the term "stationary object Doppler value" refers to a Doppler speed observed when a radar transmission wave is reflected by a stationary object. In the present disclosure, the term "stationary object" refers to an object stationary with respect to the ground. The stationary object Doppler information generator 103 is able to calculate a stationary object Doppler value Vd [km/h] by Formula (1) below.

$$Vd(\theta) = Vs \cdot \cos(\theta s - \theta) \quad (1)$$

where Vs [km/h] represents the moving speed of the radar device; θs [rad] represents the moving direction of the radar device; and θ [rad] represents the radar azimuth.

The stationary object cell identification unit 104 identifies stationary object cells on the basis of the radar profiles received from the radar 101 and the stationary object Doppler values corresponding to the radar azimuths received from the stationary object Doppler information generator 103. As used herein, the term "cells" refer to small areas obtained by separating the area in which the radar device 100 detects objects (the object detection range R), into any size. The term "stationary object cell" refers to a cell containing a reflection point determined to be attributable to a stationary object.

Specifically, in each frame, the stationary object cell identification unit 104 determines that a reflection point having a Doppler speed Vr [km/h] satisfying Formula (2) below is a stationary object and identifies a cell containing that reflection point as a stationary object cell.

$$Vd(\theta r) - \alpha \le Vr \le Vd(\theta r) + \alpha \quad (2)$$

where Vd (θ) [km/h] represents a stationary object Doppler value corresponding to a radar azimuth θ; and θr [rad] represents the azimuth of a reflection point obtained from a radar profile.

In Formula (2), α represents the amount of margin and may be a constant or may be a variable that is set in accordance with θr or Vd. The stationary object cell identification unit 104 then adds information about the identified stationary object cells (hereafter referred to as stationary object cell identification information) to the radar profile and outputs the resulting radar profile to the moving object detector 105.

A first reflection point of the present disclosure is a reflection point satisfying Formula (2) above and corresponds to an object having a Doppler speed of less than a predetermined value (threshold), that is, corresponds to a reflection point attributable to a stationary object (which may be a potential moving object, as discussed later). A second reflection point of the present disclosure is a reflection point not satisfying Formula (2) above and corresponds to an object having a Doppler speed of the predetermined value or more, that is, corresponds to a reflection point attributable to a moving object.

The moving object detector 105 performs grouping on cells other than the stationary object cells on the basis of the radar profile received from the stationary object cell identification unit 104 and containing the stationary object cell identification information in each frame. As used herein, the term "grouping" refers to a process of grouping cells by making a comparison among the positions or Doppler values of reflection points present in multiple cells and determining that cells containing reflection points having close positions or Doppler values are cells corresponding to the same object. The moving object detector 105 performs group management by assigning the same group ID to one or more cells determined to correspond to the same object.

That is, in the present embodiment, groups are made by grouping cells containing reflection points detected by the radar 101 in accordance with objects corresponding to the reflection points.

As described above, the moving object detector 105 performs grouping on cells other than the stationary object cells. Accordingly, all the cells to be grouped here correspond to moving objects. The moving object detector 105 then extracts a representative position and representative Doppler value from each of the resulting groups and generates a list of moving objects (moving object list) in the current frame by listing the grouping results. A representative position and representative Doppler value are obtained by extracting the position and Doppler value of any cell in each group.

The moving object detector 105 outputs the generated moving object list to the target-to-be-followed selector 107. The moving object list includes groups of cells containing reflection points corresponding to moving objects in the current frame (these groups correspond to second groups of the present disclosure). Hereafter, in order to simplify the description, groups of cells containing reflection points corresponding to moving objects included in the moving object list may be simply referred to as groups corresponding to moving objects included in the moving object list.

Note that when performing grouping, the moving object detector 105 may remove cells having reflected-wave strengths of predetermined value or less from cells to be processed so as to reduce the load on the processing.

The potential moving object detector 106 performs grouping on the cells identified as stationary object cells on the basis of the radar profile containing the stationary object cell identification information received from the stationary object cell identification unit 104 in each frame. In the present embodiment, the potential moving object detector 106 handles the stationary object cells to be grouped, as cells that may contain a potential moving object. The reason is that an object corresponding to a cell identified as a stationary object cell in the current frame may have been determined as a stationary object since it is moving in a direction perpendicular to the radar axis connecting the object and radar device (the cross-range direction), although it is actually an moving object.

The potential moving object detector 106 then extracts a representative position and representative Doppler value from each of the resulting groups and generates a list of potential moving objects (potential moving object list) by listing the grouping results.

The potential moving object detector 106 then outputs the generated potential moving object list to the target-to-be-followed selector 107. The potential moving object list includes groups of stationary object cells serving as potential moving objects in the current frame (these groups correspond to first groups of the present disclosure). Hereafter, in order to simplify the description, groups of stationary object cells serving as potential moving objects included in the potential moving object list may be simply referred to as groups corresponding to potential moving objects included in the potential moving object list.

Note that when performing grouping, the potential moving object detector 106 may remove cells having reflected-wave strengths of a predetermined value or less from cells to be processed so as to reduce the load on the processing.

The target-to-be-followed selector 107 determines targets to be followed in the current frame on the basis of the moving object list received from the moving object detector 105 and the potential moving object list received from the potential moving object detector 106.

The target-to-be-followed selector 107 determines groups to be followed as follows by comparing the moving object list and potential moving object list and extracting groups corresponding to the same objects as moving objects corresponding to groups included in the moving object list, from the groups included in the potential moving object list. For example, the target-to-be-followed selector 107 extracts groups whose representative positions or representative Doppler values are the same (or fall within a predetermined range) or groups whose representative positions and representative Doppler values are the same (or fall within a predetermined range), from the groups corresponding to the potential moving objects included in the potential moving object list and the groups corresponding to the moving objects included in the moving object list. The target-to-be-followed selector 107 then determines that the extracted groups corresponding to potential moving objects and the extracted groups corresponding to moving objects correspond to the same objects.

The target-to-be-followed selector 107 deletes the extracted groups corresponding to potential moving objects from the potential moving object list. The target-to-be-followed selector 107 then updates the representative positions and representative Doppler values of the corresponding moving objects in the moving object list on the basis of the representative positions and representative Doppler values of the deleted potential moving objects. Note that the target-to-be-followed selector 107 may delete, from the moving object list, moving objects having cell sizes or reflected-wave strengths of a predetermined value or less.

The groups included in the moving object list thus updated are targets to be followed in the current frame, and the groups included in the potential moving object list thus updated are potential targets to be followed in the current frame. The target-to-be-followed selector 107 then outputs the updated moving object list and potential moving object list to the moving object following processor 109.

The position calculator 108 acquires, from the buffer 110, the target-to-be-followed list of the previous frame and radar device movement information of frames from the previous frame to the current frame. The position calculator 108 predicts the positions in the current frame, of moving objects corresponding to groups included in the target-to-be-followed list. A target-to-be-followed list is a list of groups (groups to be followed) corresponding to moving objects to be followed in each frame and includes information about the Doppler speeds of the moving objects, the azimuths thereof seen from the radar device 100, and the like. A target-to-be-followed list is generated by the moving object following processor 109 (to be discussed later) and stored in the buffer 110. As used herein, the term "previous frame" refers to a frame preceding the current frame by one or more frames.

The present disclosure does not impose any limitation on a method by which the position calculator 108 predicts the positions of the moving objects in the current frame. For example, the position calculator 108 may predict the positions of the moving objects by calculating the positions of the moving objects to be followed in the previous frame on the basis of information about the positions of the groups to be followed and information about the Doppler values thereof and then converting the calculated positions in the previous frame into the positions in the current frame on the basis of the radar device movement information.

The position calculator 108 outputs the target-to-be-followed list of the previous frame and the calculated predicted position information to the moving object following processor 109.

The moving object following processor 109 generates a target-to-be-followed list of the current frame including groups to be followed in the current frame on the basis of the moving object list and potential moving object list received from the target-to-be-followed selector 107 and the target-to-be-followed list of the previous frame and the predicted position information received from the position calculator 108. The target-to-be-followed list of the previous frame corresponds to a first list of the present disclosure, and the target-to-be-followed list of the current frame corresponds to a second list of the present disclosure.

Figure 5:
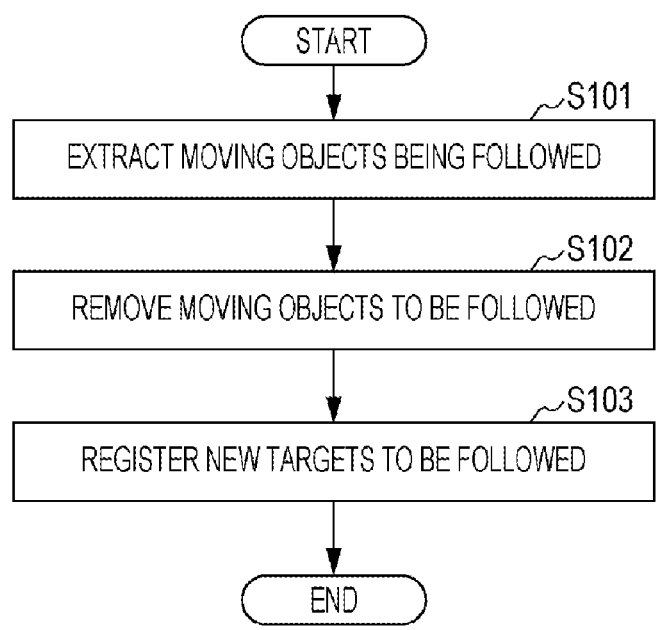
FIG. 5 shows an example operation of a moving object following processor.

FIG. 5 is a flowchart showing an example operation of the moving object following processor 109. In step S101, the moving object following processor 109 extracts, from the moving object list and potential moving object list in the current frame, groups identical to those in the target-to-be-followed list of the previous frame and then associates them with each other.

Specific examples of a method for association in step S101 include the following method:

That is, on the basis of predicted position information of moving objects corresponding to groups included in the target-to-be-followed list of the previous frame, the moving object following processor 109 extracts groups corresponding to objects nearest the predicted positions in the current frame, of the moving objects from the moving object list and potential moving object list.

The extracted groups are associated as groups to be followed in the current frame corresponding to the groups to be followed in the previous frame.

Alternatively, the moving object following processor 109 may make association by, on the basis of predicted position information of moving objects corresponding to groups included in the target-to-be-followed list, generating or selecting statistical values (e.g., the barycenter positions) of objects within a predetermined range from the predicted positions of the moving objects, as the new positions of the objects.

By applying step S101 to the results of grouping shown in FIGS. 3A and 3B and then making association in this manner, the group x in frame n in FIG. 3A becomes a target to be followed in the moving object list. By using the predicted position information, the group y of in frame n+1 in FIG. 3B becomes a target to be followed in the potential moving object list.

Then, in step S102, the moving object following processor 109 performs a following removal process. The following removal process is a process of removing groups corresponding to moving objects to be followed which have not been associated in step S101, from the target-to-be-followed list of the previous frame. The moving objects to be followed which have not been associated in step S101 are groups that are not included in the moving object list or potential moving object list of the current frame. Accordingly, the moving objects to be followed which have not been associated in step S101 are not regarded as moving objects to be followed, at least in the current frame.

For example, in frame n shown in FIG. 3A, a group corresponding to a moving object to be followed is one group, the group x. On the other hand, in frame n+1 shown in FIG. 3B, group y is extracted from the potential moving object list. For this reason, if step S102 is applied to the grouping results shown in FIGS. 3A and 3B, there is no group to be removed.

Note that in step S102, the moving object following processor 109 may remove groups corresponding to moving objects to be followed that have not been associated in the current frame. For example, only if moving objects to be followed have not been associated in a predetermined number of continuous frames, groups corresponding to these moving objects to be followed may be removed. In the latter case, the moving object following processor 109 may determine the number (predetermined number) of continuous frames until the corresponding groups are removed, in accordance with the number of times these moving objects to be followed have been moving objects to be followed.

In step S103, the moving object following processor 109 performs a new target-to-be-followed registration process. The new target-to-be-followed registration process is a process of generating a target-to-be-followed list of the current frame by extracting groups corresponding to moving objects which have not been associated in step S101, from the groups included in the moving object list received from the target-to-be-followed selector 107 and adding the extracted groups to the target-to-be-followed list of the previous frame.

For example, in frame n+1 shown in FIG. 3B, there is no group corresponding to a moving object. For this reason, if step S103 is applied to the grouping results illustrated in FIGS. 3A and 3B, there is no group to be added to the target-to-be-followed list of frame n.

By performing steps S101 to S103 described above, the moving object following processor 109 generates a target-to-be-followed list of the current frame. The moving object following processor 109 outputs the generated target-to-be-followed list of the current frame to the buffer 110 and the outside of radar device 100. As described above, the target-to-be-followed list outputted to the outside of the radar device 100 includes information about the speeds and azimuths of moving objects being currently followed. Thus, for example, the vehicle controller or the like (not shown in FIG. 4) is able to perform vehicle control or the like using the target-to-be-followed list so that the vehicle does not collide with the moving objects to be followed.

By performing steps S101 to S103 described above, the moving object following processor 109 is able to generate a target-to-be-followed list, which is a list of groups corresponding to moving objects to be followed in the current frame.

The buffer 110 stores the target-to-be-followed list received from the moving object following processor 109 in each frame. The buffer 110 also stores radar device movement information received from the movement amount calculator 102 in each frame. The buffer 110 then outputs the target-to-be-followed list of the previous frame and the radar device movement information to the position calculator 108.

According to the configuration described above, if an object detected as a stationary object in the current frame is found to have been a moving object to be followed in the previous frame, the radar device 100 continuously follows the object as a moving object to be followed. Thus, even if an object which is actually moving is determined to be a stationary object in terms of the relationship between the moving direction and radar azimuth in a certain frame, the object is continuously regarded as a moving object to be followed in the subsequent frame. As a result, the object detection accuracy of the radar device 100 can be improved.

Example Operation

Figure 6:
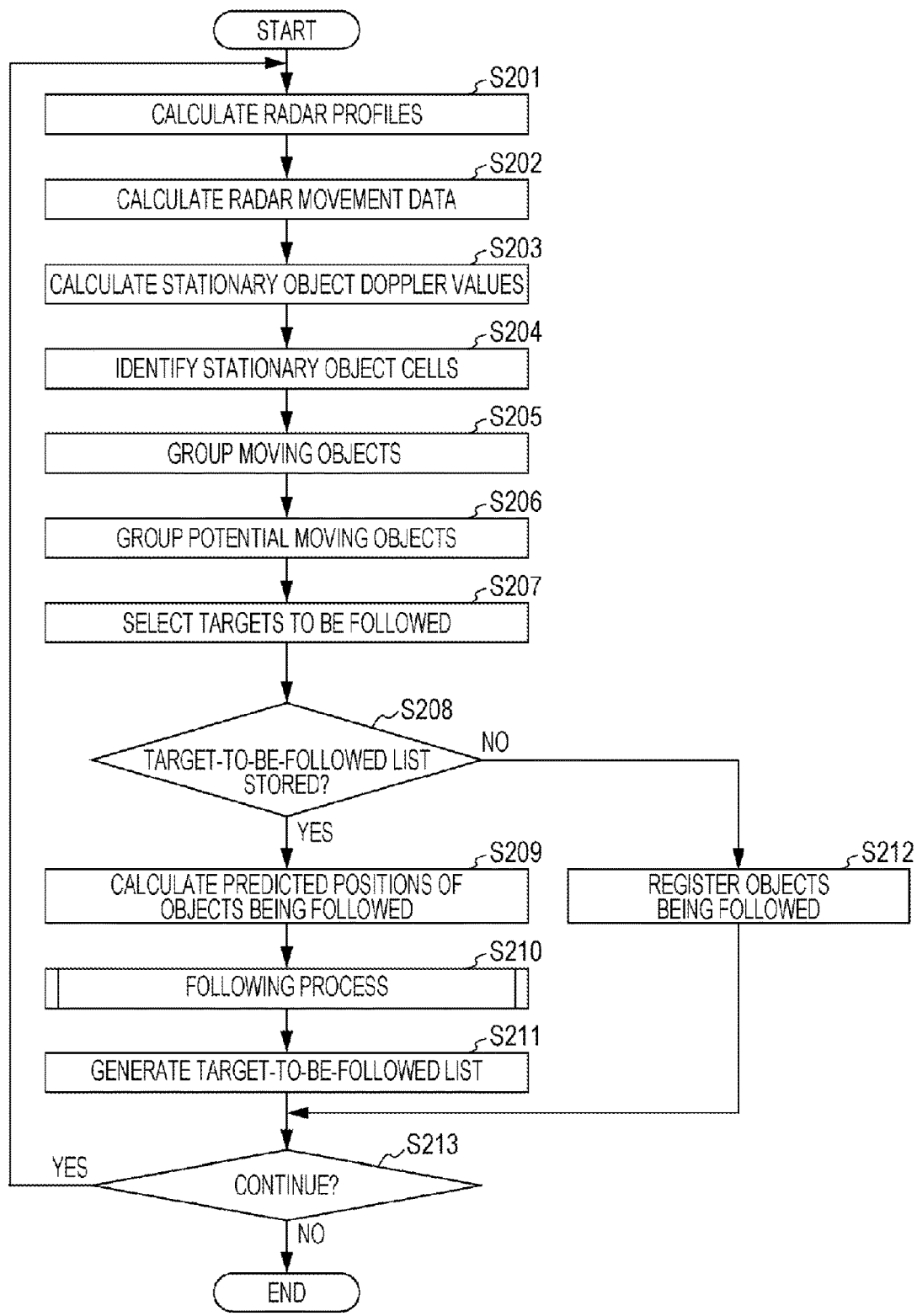
FIG. 6 shows the flow of the operation of the radar device.

Next, an example operation of the entire radar device 100 will be described with reference to FIG. 6. FIG. 6 is a flowchart showing the flow of the operation of the radar device 100.

In step S201, the radar 101 generates radar profiles corresponding to radar azimuths in each frame and outputs them to the movement amount calculator 102.

In step S202, the movement amount calculator 102 calculates radar device movement data about the amount of movement of the radar device 100 (the moving direction and moving speed of the radar device 100) on the basis of vehicle movement information such as the moving direction and moving speed of the vehicle detected by vehicle sensors and then outputs the calculated radar device movement information to the stationary object Doppler information generator 103.

In step S203, the stationary object Doppler information generator 103 calculates stationary object Doppler values corresponding to the radar azimuths on the basis of the radar device movement information. As described above, the term "stationary object Doppler value" refers to a Doppler speed observed when a radar transmission wave is reflected by a stationary object.

In step S204, the stationary object cell identification unit 104 identifies stationary object cells on the basis of the radar profiles and the stationary object Doppler values corresponding to the radar azimuths. Specifically, if the Doppler speed of a reflection point falls within a predetermined range from a stationary object Doppler value corresponding to the azimuth of the reflection point, the stationary object cell identification unit 104 determines that a cell containing the reflection point is a stationary object cell.

In step S205, the moving object detector 105 performs grouping on cells other than the stationary object cells identified in step S204 and makes a moving object list by listing the results.

In step S206, the potential moving object detector 106 performs grouping on the stationary object cells identified in step S204 and makes a potential moving object list by listing the results.

In step S207, the target-to-be-followed selector 107 selects targets to be followed on the basis of the moving object list and potential moving object list. Specifically, the target-to-be-followed selector 107 extracts, from the groups included in the potential moving object list, groups corresponding to the same objects as moving objects corresponding to groups included in the moving object list. For example, the target-to-be-followed selector 107 extracts, from the groups included in the potential moving object list and the groups included in the moving object list, groups having representative positions or representative Doppler values that are the same (or fall within a predetermined range), or groups having representative positions and representative Doppler values that are the same (or fall within a predetermined range). The target-to-be-followed selector 107 determines that the potential moving objects and moving objects corresponding to the extracted groups are the same objects. The target-to-be-followed selector 107 then updates the moving object list and deletes the extracted groups from the potential moving object list.

In step S208, the position calculator 108 determines whether the buffer 110 is storing a target-to-be-followed list, which is a list of groups corresponding to moving objects being followed in the previous frame. If it is determined that a target-to-be-followed list is stored, the process proceeds to step S209; otherwise, the process proceeds to S212.

In step S209, the position calculator 108 acquires the target-to-be-followed list of the previous frame and the radar device movement data from the buffer 110 and calculates the positions (the predicted positions) in the current frame, of moving objects to be followed corresponding to the groups in the target-to-be-followed list.

In step S210, the moving object following processor 109 performs a following process of following the moving objects to be followed (see FIG. 5 described above), on the basis of the moving object list and potential moving object list received from the target-to-be-followed selector 107 and the target-to-be-followed list and predicted position information received from the position calculator 108.

In step S211, the moving object following processor 109 outputs the target-to-be-followed list of the current frame generated by the following process performed in S210.

In step S212, the moving object following processor 109 newly generates a target-to-be-followed list using groups corresponding to moving objects included in the moving object list.

In step S213, the radar device 100 determines whether it continues following the moving objects. If it determines that it continues following the moving objects, the radar device 100 returns to step S201 and repeatedly performs steps S201 to S212 in a frame subsequent to the current frame. If it determines that it does not continue following the moving objects, the radar device 100 ends the process.

As described above, the radar device 100 of the present embodiment generates a moving object list including groups other than groups of cells containing reflection points determined to be stationary objects, of the groups of cells containing reflection points detected by the radar 101 in the current frame and a potential moving object list including the groups of the cells containing the reflection points determined to be stationary objects. The radar device 100 then predicts the positions in the current frame, of groups to be followed in the previous frame (those in the target-to-be-followed list of the previous frame). The radar device 100 then extracts groups having the same predicted positions from the moving object list and potential moving object list and generates a target-to-be-followed list of the current frame including the extracted groups and groups included in the moving object list, of the groups which have not been extracted.

According to the radar device 100 of the present embodiment thus configured, if an object detected as a stationary object in the current frame is found to have been a moving object to be followed in the previous frame, the object is continuously followed as a moving object to be followed. Thus, even if an object which is actually moving is determined to be a stationary object in a certain frame in terms of the relationship between the moving direction and radar azimuth, the object can be continuously followed. Thus, the radar device 100 is able to accurately follow the object.

While the embodiment has been described with reference to the drawings, the present disclosure is not limited thereto, as a matter of course. Those skilled in the art would readily conceive of changes or modifications thereto without departing from the scope of Claims, and such changes or modifications are to be construed as falling within the technical scope of the present disclosure, as a matter of course. Further, any elements in the embodiment may be combined without departing from the scope of the present disclosure.

The present disclosure can be realized by software, hardware, or software in cooperation with hardware.

Each functional block used in the description of the embodiment described above can be partly or entirely realized by an LSI such as an integrated circuit, and each process described in the embodiment may be controlled partly or entirely by the same LSI or a combination of LSIs. The LSI may be formed as individual chips, or one chip may be formed so as to include a part or all of the functional blocks. The LSI may include a data input and output coupled thereto. The LSI here may be referred to as an IC, a system LSI, a super LSI, or an ultra LSI depending on the difference in the degree of integration.

The technique of implementing an integrated circuit is not limited to an LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If a future integrated circuit technology replaces LSIs as a result of the advancement of semiconductor technology or other derivative technology, the functional blocks could be integrated using the future integrated circuit technology. Biotechnology can also be applied.

SUMMARY OF PRESENT DISCLOSURE

A radar device of one aspect of the present disclosure includes radar circuitry which, in operation, transmits a plurality of radar signals, receives the plurality of radar signals, each of the plurality of received radar signals being reflected from a reflection point of a plurality of reflection points on an object of a plurality of objects, and detects, based on the plurality of received radar signals, one or more information elements, a first group detector which, in operation, groups the one or more information elements into one or more first groups in each frame, the one or more first groups including information on one or more first objects of which Doppler speeds fall within a determined range, the one or more first objects being included in the plurality of objects, a second group detector which, in operation, groups the one or more information elements into one or more second groups in each frame, the one or more second groups including information on one or more second objects of which Doppler speeds fall outside the determined range, the one or more second objects being included in the plurality of objects, a position calculator which, in operation, calculates first positions in m-th frame, of positions of groups to be followed of the first groups and the second groups in n-th frame, n being an integer of 1 or more, m being an integer satisfying m>n, and a processor which, in operation, extracts the groups to be followed in the m-th frame from the first groups and the second groups in the m-th frame using the first positions.

In a radar device of another aspect of the present disclosure, the first groups are objects which are stationary with respect to a ground.

A radar device of another aspect of the present disclosure further includes update circuitry which, in operation, deletes a group included in both the first groups and the second groups from the first groups in each frame.

In a radar device of another aspect of the present disclosure, the position calculator calculates the predicted positions in the m-th frame on the basis of moving speeds and moving directions of the radar device in frames from the n-th frame to the m-th frame.

A method for determining targets to be followed of one aspect of the present disclosure includes receiving and transmitting a radar signal and detecting a plurality of reflection points in each frame, grouping one or more first reflection points having Doppler speeds falling within a predetermined range into one or more first groups in each frame, grouping one or more second reflection points having Doppler speeds falling outside the predetermined range into one or more second groups in each frame, calculating predicted positions in m-th frame, of positions of groups to be followed of the first groups and the second groups in n-th frame, n being an integer of 1 or more, m being an integer satisfying m>n, and extracting the groups to be followed in the m-th frame from the first groups and the second groups in the m-th frame using the predicted positions.

The present disclosure is used as a radar device that detects and follows an object.

What is claimed is:

1. A radar device comprising:
   radar circuitry which, in operation, transmits a plurality of radar signals, receives the plurality of radar signals, each of the plurality of received radar signals being reflected from a reflection point of a plurality of reflection points on an object of a plurality of objects, and detects, based on the plurality of received radar signals, a plurality of information elements;
   a first group detector which, in operation, groups first one or more information elements of the plurality of information elements into one or more first groups in each frame, the one or more first groups including information on one or more first objects of which Doppler speeds fall within a determined range, the one or more first objects being included in the plurality of objects;
   a second group detector which, in operation, groups second one or more information elements of the plurality of information elements into one or more second groups in each frame, the one or more second groups including information on one or more second objects of which Doppler speeds fall outside the determined range, the one or more second objects being included in the plurality of objects;
   a position calculator which, in operation, calculates first positions in an m-th frame, based on positions of tracked groups in an n-th frame of the first groups and the second groups in the n-th frame, n being an integer of 1 or more, m being an integer satisfying m>n; and
   a processor which, in operation, extracts tracked groups in the m-th frame from the first groups and the second groups in the m-th frame using the first positions, wherein
   the tracked groups in the m-th frame include the second one or more information elements in the one or more second groups in the m-th frame and the first one or more information elements in the one or more first groups in the m-th frame, the one or more second groups in the n-th frame being designated as the first one or more information elements in the one or more first groups in the m-th frame.

2. The radar device of claim 1, wherein the one or more first objects in the m-th frame are stationary and movable with respect to a ground in the n-th frame.

3. The radar device of claim 1, comprising update circuitry which, in operation, deletes a group included in both the first groups and the second groups from the first groups in each frame.

4. The radar device of claim 1, wherein the position calculator calculates the first positions in the m-th frame on the basis of moving speeds and moving directions of the radar device in frames from the n-th frame to the m-th frame.

5. A method for determining targets to be followed, comprising:
   transmitting a plurality of radar signals;
   receiving the plurality of radar signals, each of the plurality of received radar signals being reflected from a reflection point of a plurality of reflection points on an object of a plurality of objects;
   detecting, based on the plurality of received radar signals, a plurality of information elements;
   grouping first one or more information elements of the plurality of information elements into one or more first groups in each frame, the one or more first groups including information on one or more first objects of which Doppler speeds fall within a determined range, the one or more first objects being included in the plurality of objects;
   grouping second one or more information elements of the plurality of information elements into one or more second groups in each frame, the one or more second groups including information on one or more second objects of which Doppler speeds fall outside the determined range, the one or more second objects being included in the plurality of objects;
   calculating first positions in an m-th frame based on positions of tracked groups in an n-th frame of the first groups and the second groups in the n-th frame, n being an integer of 1 or more, m being an integer satisfying m>n; and
   extracting tracked groups in the m-th frame from the first groups and the second groups in the m-th frame using the first positions, wherein
   the tracked groups in the m-th frame include the second one or more information elements in the one or more second groups in the m-th frame and the first one or more information elements in the one or more first groups in the m-th frame, the one or more second groups in the n-th frame being designated as the first one or more information elements in the one or more first groups in the m-th frame.

* * * * *